US009665678B2

(12) United States Patent
Cho et al.

(10) Patent No.: US 9,665,678 B2
(45) Date of Patent: May 30, 2017

(54) METHOD AND PROGRAM FOR DESIGNING INTEGRATED CIRCUIT

(71) Applicant: Samsung Electronics Co., Ltd., Suwon-si (KR)

(72) Inventors: Sung-we Cho, Hwaseong-si (KR); Dal-hee Lee, Seoul (KR); Ha-young Kim, Seoul (KR); Jae-woo Seo, Seoul (KR); Jin-tae Kim, Daejeon (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/744,178

(22) Filed: Jun. 19, 2015

(65) Prior Publication Data

US 2016/0034627 A1    Feb. 4, 2016

Related U.S. Application Data

(60) Provisional application No. 62/030,245, filed on Jul. 29, 2014.

(30) Foreign Application Priority Data

Dec. 2, 2014  (KR) ........................ 10-2014-0170825

(51) Int. Cl.
    *G06F 17/50*      (2006.01)
(52) U.S. Cl.
    CPC ........ *G06F 17/5072* (2013.01); *G06F 17/505* (2013.01)

(58) Field of Classification Search
    CPC ............... G06F 17/505; G06F 17/5068; G06F 17/5072; G06F 17/5077; G06F 17/5045
    See application file for complete search history.

(56) References Cited

U.S. PATENT DOCUMENTS

| 6,957,402 | B2 | 10/2005 | Templeton et al. |
| 7,315,995 | B2 | 1/2008 | Nishiwaki |
| 7,487,474 | B2 | 2/2009 | Ciplickas et al. |
| 7,509,612 | B2 | 3/2009 | Sakihama et al. |
| 7,716,612 | B1 * | 5/2010 | Gupta ................. G06F 17/5045 703/16 |
| 8,141,016 | B2 | 3/2012 | Correale, Jr. et al. |
| 8,756,555 | B2 | 6/2014 | Gupta et al. |
| 2006/0193186 | A1 * | 8/2006 | Sakihama ........... G06F 17/5068 365/200 |
| 2007/0277139 | A1 | 11/2007 | Kurokawa |

(Continued)

FOREIGN PATENT DOCUMENTS

JP    2013257646    12/2013

*Primary Examiner* — Vuthe Siek
(74) *Attorney, Agent, or Firm* — Onello & Mello LLP

(57) ABSTRACT

A method of designing an integrated circuit includes a processor receiving input data initially-defining the integrated circuit using a plurality of first standard cells designed to optimize a performance or yield characteristic. The processor substitutes at least one second standard cell designed to optimize a different performance or yield characteristic from that for which the first standard cells were optimized for a corresponding one of the first standard cells. The processor generates output data defining the integrated circuit including the second standard cell. The substituted second standard cell has the same function as the corresponding first standard cell for which it was substituted.

17 Claims, 13 Drawing Sheets

(56) References Cited

U.S. PATENT DOCUMENTS

2008/0005707 A1\* 1/2008 Papanikolaou ..... G06F 17/5009
                                                   702/81
2010/0138803 A1   6/2010 Minamiyama et al.
2010/0270600 A1  10/2010 Inukai et al.
2012/0131531 A1\* 5/2012 Tirumala ............ G06F 17/5031
                                                   716/113

\* cited by examiner

METHOD AND PROGRAM FOR DESIGNING INTEGRATED CIRCUIT

CROSS-REFERENCE TO RELATED APPLICATION

This application claims the benefit of U.S. Provisional Application No. 62/030,245, filed on Jul. 29, 2014, in the United States Patent and Trademark Office and the benefit of Korean Patent Application No. 10-2014-017825, filed on Dec. 2, 2014, in the Korean Intellectual Property Office, the disclosures of which are incorporated herein in their entirety by reference.

BACKGROUND

Inventive concepts relate to a method for designing an integrated circuit (IC) and, and more particularly, to a method of designing a semiconductor IC using standard cells.

With development of semiconductor process technology, transistors are being gradually downscaled so that a relatively large number of transistors may be integrated in a semiconductor device. For example, a system-on-chip (SOC), which refers to an integrated circuit (IC) embodied by integrating all components of a computer or another electronic system in one chip, has widely been employed in various applications.

As the sizes of transistors integrated in semiconductor devices gradually decrease, the difficulty of manufacturing the semiconductor devices may increase. That is, the potential for flawed devices increases with the reduction in feature size and semiconductor devices may include semiconductor devices that do not operate properly. To reduce defects and increase yield, an improvement in semiconductor process technology and design for manufacturing (DFM), which considers increased in yield in the design stage for manufacturing a semiconductor device, may be employed.

SUMMARY

According to exemplary embodiments of inventive concepts, there is provided a method of designing an IC. The method includes receiving input data defining an IC with a plurality of first standard cells, preparing at least one second standard cell having a layout that provides higher yield of the IC than the plurality of first standard cells, swapping at least one of the first standard cells included in the IC for the corresponding second standard cell, and generating output data defining the IC including the second standard cell. The first and second standard cells, which correspond to each other, have the same function and the same layout footprint.

In exemplary embodiments in accordance with principles of inventive concepts swapping of the at least one of the first standard cells for the corresponding second standard cell may include swapping a first standard cell, which is not connected to a critical path of the IC according to the input data, for the second standard cell.

In exemplary embodiments in accordance with principles of inventive concepts swapping of the at least one of the first standard cells for the corresponding second standard cell may further include re-swapping the second standard cell for the corresponding first standard cell, based on a result of analysis of the critical path of the IC including the second standard cell.

In exemplary embodiments in accordance with principles of inventive concepts swapping of the at least one of the first standard cells for the corresponding second standard cell may further include re-swapping the second standard cell for the corresponding first standard cell, based on a result of analysis of power consumption of the IC including the second standard cell.

In exemplary embodiments in accordance with principles of inventive concepts input data may include netlist data of the IC that is synthesized with the plurality of first standard cells.

In exemplary embodiments in accordance with principles of inventive concepts input data may include layout data of the IC, which is generated by placing and routing the plurality of first standard cells.

In exemplary embodiments in accordance with principles of inventive concepts first standard cell may include an active region including at least one stepwise portion, and the second standard cell may include an active region from which the stepwise portion is removed.

In exemplary embodiments in accordance with principles of inventive concepts active region of the first standard cell may include at least one discontinuous portion removed by using an etching process, and the second standard cell may include the active region from which the stepwise portion is removed by expanding or reducing even the at least one discontinuous portion of the active region of the first standard cell.

In exemplary embodiments in accordance with principles of inventive concepts, there is provided a method of designing an IC. The method includes preparing a first library including information corresponding to a plurality of first standard cells and a second library including information corresponding to at least one second standard cell having a layout that provides higher yield than the first standard cells, defining the IC based on the first and second libraries, swapping at least one of the first standard cells included in the IC for the corresponding second standard cell, and generating output data defining the IC including the first and second standard cells. The first and second standard cells, which correspond to each other, may have the same function and the same layout footprint.

In exemplary embodiments in accordance with principles of inventive concepts swapping of the at least one of the first standard cells for the corresponding second standard cell may include swapping a first standard cell, which is not connected to a critical path of the IC defined based on the first library, for the second standard cell.

In exemplary embodiments in accordance with principles of inventive concepts swapping of the at least one of the first standard cells may further include re-swapping the second standard cell for the corresponding first standard cell, based on a result of analysis of the critical path of the IC including the second standard cell.

In exemplary embodiments in accordance with principles of inventive concepts defining of the IC based on the first and second libraries may include generating netlist data by synthesizing the IC with the plurality of first and second standard cells.

In exemplary embodiments in accordance with principles of inventive concepts defining of the IC based on the first and second libraries may include generating layout data of the IC in which the plurality of first and second standard cells are placed and routed.

In exemplary embodiments in accordance with principles of inventive concepts a first standard cell may include an active region including at least one stepwise portion, and the second standard cell may include an active region from which the stepwise portion is removed.

In exemplary embodiments in accordance with principles of inventive concepts the active region of the first standard cell may include at least one discontinuous portion that is removed by using an etching process, and the second standard cell may include an active region, from which the stepwise portion is removed by expanding or reducing even the discontinuous portion of the active region of the first standard cell.

In exemplary embodiments in accordance with principles of inventive concepts, there is provided a method of designing an IC. The method includes receiving input data defining an IC with a plurality of second standard cells, preparing at least one first standard cell having a layout that provides lower yield and higher performance (in terms of processing speed or power consumption, for example) of the IC than the plurality of second standard cells, swapping at least one of the second standard cells included in the IC for the corresponding first standard cell, and generating output data defining the IC including the first standard cell. The first and second standard cells, which correspond to each other, have the same function and the same layout footprint.

In exemplary embodiments in accordance with principles of inventive concepts swapping of the at least one of the second standard cells for the corresponding first standard cell may include swapping a second standard cell, which is connected to a critical path of the IC according to the input data, for the corresponding first standard cell.

In exemplary embodiments in accordance with principles of inventive concepts first standard cell may include an active region including at least one stepwise portion, and the second standard cell may include an active region from which the stepwise portion is removed.

In exemplary embodiments in accordance with principles of inventive concepts the active region of the first standard cell may include at least one discontinuous portion that is removed by using an etching process, and the second standard cell may include the active region from which the stepwise portion is removed by expanding or reducing even the at least one discontinuous portion of the active region of the first active region.

In exemplary embodiments in accordance with principles of inventive concepts, there is provided a computer-readable storage medium having embodied thereon a program including a plurality of instructions for executing the method of designing the IC according to any one of exemplary embodiments of inventive concepts.

In exemplary embodiments in accordance with principles of inventive concepts, a method of designing an integrated circuit includes a processor receiving input data initially-defining an integrated circuit using a plurality of first standard cells designed to optimize a performance or yield characteristic, the processor substituting at least one second standard cell designed to optimize a different performance or yield characteristic from that for which the first standard cells were optimized for a corresponding one of the first standard cells, and the processor generating output data defining the integrated circuit including the second standard cell, wherein the first and second corresponding standard cells have the same function.

In exemplary embodiments in accordance with principles of inventive concepts, a method of designing an integrated circuit includes first standard cells optimized for the performance characteristic of processing speed and the second standard cell optimized for production yield.

In exemplary embodiments in accordance with principles of inventive concepts, a method of designing an integrated circuit includes first standard cells are optimized for the performance characteristic of power consumption and the second standard cells optimized for production yield.

In exemplary embodiments in accordance with principles of inventive concepts, a method of designing an integrated circuit includes first standard cells optimized for production yield and second standard cells are optimized for a performance characteristic.

In exemplary embodiments in accordance with principles of inventive concepts, a method of designing an integrated circuit includes input data that comprises layout data of the integrated circuit, which is generated by placing and routing the plurality of first standard cells, the substituting the corresponding second standard cell for at least one of the first standard cells comprises substituting for a first standard cell that is not connected to a critical path of the IC according to the input data for the second standard cell and the first standard cell comprises an active region including at least one stepwise portion, and the second standard cell comprises an active region from which the stepwise portion is removed.

BRIEF DESCRIPTION OF THE DRAWINGS

Exemplary embodiments of inventive concepts will be more clearly understood from the following detailed description taken in conjunction with the accompanying drawings in which.

DETAILED DESCRIPTION OF THE EMBODIMENTS

Figure 1:
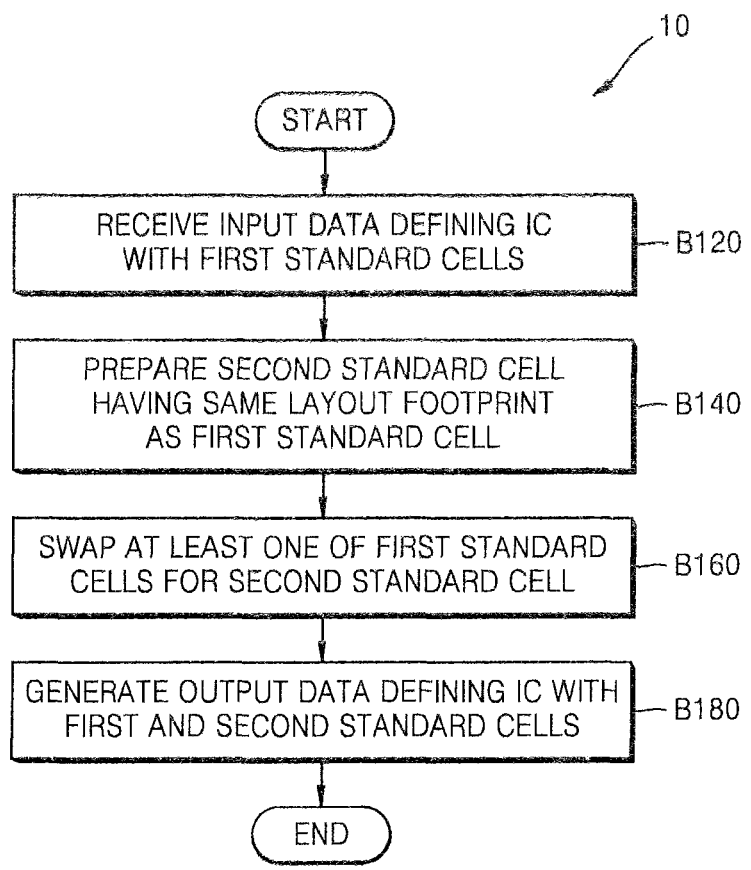
FIG. 1 is a flowchart of a method of designing an integrated circuit (IC) according to an exemplary embodiment of inventive concepts.

Inventive concepts will now be described more fully hereinafter with reference to the accompanying drawings, in which exemplary embodiments of inventive concepts are shown. These embodiments are provided so that this disclosure is thorough and complete and fully conveys the scope of inventive concepts to one skilled in the art. Accordingly, while inventive concepts can be modified in various ways and take on various alternative forms, specific embodiments thereof are shown in the drawings and described in detail below as examples. There is no intent to limit inventive concepts to the particular forms disclosed. On the contrary, inventive concepts cover all modifications, equivalents, and alternatives falling within the spirit and scope of the appended claims. Like reference numerals refer to like elements throughout. In the drawings, the thicknesses of layers and regions may be exaggerated for clarity.

The terminology used herein is for the purpose of describing particular embodiments only and is not intended to be limiting of example embodiments. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of normal skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

In exemplary embodiments in accordance with principles of inventive concepts, a method of designing an integrated circuit includes a processor receiving input data initially-defining an integrated circuit using a plurality of first standard cells designed to optimize a performance or yield characteristic. The processor substitutes at least one second standard cell designed to optimize a different performance or yield characteristic from that for which the first standard cells were optimized for a corresponding one of the first standard cells. The processor generates output data defining the integrated circuit including the second standard cell. The second standard cell has the same function as the first standard cell for which it was substituted and, in exemplary embodiments, has the same footprint and pin-out.

In exemplary embodiments, the performance characteristics include processing speed and power consumption. A library of standard cells in accordance with principles of inventive concepts may include cells that are optimized for integrated circuit yield by, for example, eliminating a stepwise change in a cell layout and that, nevertheless, have the same footprint and pin-out as standard cells optimized for performance (for example, processing speed or power consumption). That is, active areas having stepwise, or "corner" features may be employed to increase performance while minimizing the impact on cell area. However, such non-continuous feature changes may be difficult to manufacture and corner-rounding of transistor features may reduce yield.

Standard cells optimized for yield may be substituted for standard cells optimized for performance, particularly in non-critical paths of the integrated circuit. Substitutions may be carried out iteratively and performance of the integrated circuit may be analysed after a substitution in order to ensure proper performance of the completed integrated circuit. In this manner an integrated circuit may be produced that features high yield while, at the same time, meeting critical performance requirements.

The second standard cells may be from a derivative library of standard cells that feature the same cell areas and pin positions and functions as the corresponding cells of the first standard cells, but layout patterns that don't impact cell areas and pin-out are modified to less-aggressive, higher-yield, patterns. A derivative library may be generated in accordance with principles of inventive concepts that improves yield, with the trade-off that performance associated with each of the cells in the derivative library may be less than the performance of a corresponding cell from the library from which the high-yield cell is derived. Cells in the derivative library may include layouts in which aggressive layout patterns are suppressed in various layers such as active, contact, poly, via, and metal layers, for example. Cell features (e.g., footprint and pin-out) in the derivative library are the same as in the source library, so that cell swapping may be carried out without a design rule check violation after placement and routing. In accordance with principles of inventive concepts, selective employment of derivative high-yield cells improves yield while having minimal impact on the resulting integrated circuit's performance.

FIG. 1 is a flowchart of an exemplary embodiment of a method 10 of designing an IC in accordance with principles of inventive concepts. As shown in FIG. 1, the method 10 of designing the IC may include receiving input data defining the IC with first standard cells (operation B120). The first standard cells may be standard cells corresponding to information included in a first library, which is a standard cell library. The first library may include information corresponding to a plurality of first standard cells and may include information regarding functions, timing information, power information, and layout information of the respective first standard cells. A standard cell may be a unit of an IC, and a size of a layout of the standard cell may obey a predetermined rule. For example, a height (a length obtained in a first direction perpendicular to a second direction in a plan view of the IC) of the layout of the standard cell may be constant. The standard cell may include an input pin and an output pin, and process a signal applied to the input pin and output a signal through the output pin.

According to an exemplary embodiment of inventive concepts, the first standard cell corresponding to information included in the first library may be designed to have high efficiency. High efficiency may be manifested as high performance in terms of processing speed or power consumption, for example. In exemplary embodiments, the first standard cell may be designed to improve performance, for example, to minimize the time taken to output a signal to an output pin in response to a signal received through an input pin. An IC may be defined to selectively include a plurality of first standard cells, each of which corresponds to information included in the first library, so as to satisfy desired performance of the IC.

According to an exemplary embodiment of inventive concepts, the input data may be data generated by synthesizing an abstract type of behavior of the IC, for example, data defined by a register transfer level (RTL), using the standard cell library. For example, the input data may be a bitstream or a netlist generated by synthesizing an IC defined by a hardware description language (HDL), such as a VHSIC HDL (VHDL) and Verilog.

According to an exemplary embodiment of inventive concepts, input data may be data defining a layout of an IC. For example, the input data may include geometric information defining a structure embodied by a semiconductor material, a metal, and an insulating material. The layout of the IC, which is defined by the input data, may include a layout of the first standard cells and wires configured to connect the first standard cells to one another.

As shown in FIG. 1, the method 10 of designing the IC may include preparing a second standard cell having the same layout footprint as the layout footprint of the first standard cell. The footprint (or layout footprint) may include a size of a layout of a standard cell, that is, information regarding lengths of the standard cell obtained in the first and second directions and information regarding positions of the input pin and the output pin. That is, when the first and second standard cells have the same footprint, a size of a layout of the first standard cell may be equal to a size of a layout of the second standard cell, and pins of the first standard cell may be in the same positions as pins of the second standard cell, for example. The second standard cell may be a standard cell corresponding to information included in a second library, which is a standard cell library. The second library may include at least one second standard cell corresponding to the first standard cells of the first library. The second library may include information regarding functions, timing information, power information, and layout information for each of the at least one second standard cell. The second library may include information of the first standard cells of the first library, which correspond to the at least one second standard cell.

According to an exemplary embodiment of inventive concepts, the second standard cell corresponding to the first standard cell may provide the same function as the first standard cell and may have a layout that provides higher yield of the IC than a layout of the first standard cell. As described above, the first standard cell may be a highly efficient, or high performance, standard cell and embodying, or implementing, the layout of the first standard cell may be relatively difficult in terms of a semiconductor process. In accordance with principles of inventive concepts, embodying the layout of the second standard cell may be less difficult than embodying the layout of the first standard cell corresponding thereto, in terms of a semiconductor process. Thus, although the second standard cell may have lower performance than the first standard cell, the layout of the second standard cell may be more advantageous than the layout of the first standard cell in terms of implementation, as indicated by design for manufacturing (DFM).

According to an exemplary embodiment of inventive concepts, the second library may include information of a plurality of second standard cells corresponding to one first standard cell. Since the plurality of second standard cells corresponding to one first standard cell may have different layouts according to an extent to which the layouts of the plurality of second standard cells are improved in terms of DFM, the plurality of second standard cells may have different performances. Accordingly, the second library may include information of the plurality of second standard cells corresponding to one first standard cell. Thus, a degree of freedom for design of an IC may be increased so that the IC may be designed optimally in terms of both performance and manufacturing, or manufacturability.

As shown in FIG. 1, the method 10 of designing the IC may include swapping at least one of the first standard cells for the second standard cell (B160). For example, at least one of the first standard cells included in the IC may be swapped for a corresponding second standard cell, based on timing information or power consumption information of the IC. The IC may include a first standard cell, which may hardly, or only marginally or weakly, affect performance of the IC. By swapping the first standard cell for the second standard cell according to the exemplary embodiment of inventive concepts, the performance of the IC may be maintained (because the cell has little effect on the IC's performance) and simultaneously, yield of the IC may be increased.

Because the second standard cell has the same footprint as the footprint of the first standard cell, the operation B160 of swapping the first standard cell for the second standard cell may be easily performed according to an exemplary embodiment of inventive concepts. In other words, after the first standard cell is swapped for the second standard cell, an additional re-synthesis process, a process of placing standard cells, or a routing process may not be required. Also, when the second library includes information corresponding to a plurality of second standard cells corresponding to the first standard cell, the first standard cell may be swapped for one of the plurality of second standard cells based on a margin (for example, a timing margin or a power margin) which the first standard cell has in the IC.

As shown in FIG. 1, the method 10 of designing the IC may include generating output data defining the IC with the first and second standard cells (B180). In the operation B160 of swapping at least one of the first standard cells for the second standard cell, the IC may include the first and second standard cells, and output data defining the IC may be generated. For example, when the received input data is data (for example, a bitstream or a netlist) generated by synthesizing the IC, the output data may be a bitstream or a netlist, and when the received input data is data described in a graphic data system II (GDSII) format to define the layout of the IC, the output data may also be data defining the layout of the IC.

Figure 2:
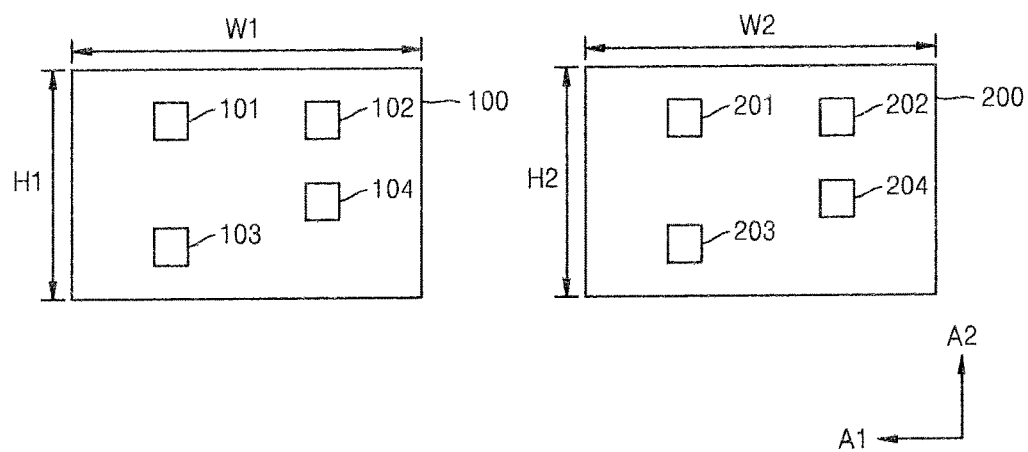
FIG. 2 illustrates layouts of first and second standard cells according to an exemplary embodiment of inventive concepts.

FIG. 2 illustrates layouts 100 and 200 of first and second standard cells according to an exemplary embodiment of inventive concepts. As described above, the second standard cell may have the same footprint as a footprint of the first standard cell. Thus, an operation of swapping the first standard cell for the second standard cell may be easily performed without requiring an additional subsequent operation. The layouts 100 and 200 of the first and second standard cells shown in FIG. 2 are only examples, and inventive concepts are not limited thereto.

As shown in a left portion of FIG. 2, the layout 100 of the first standard cell may have a width W1 (or a length obtained in a first direction A1) and a height H1 (or a length obtained in a second direction A2). The first standard cell may include four input/output (I/O) pins, and four pins 101, 102, 103, and 104 may be disposed in the layout 100 of the first standard cell. The four pins 101, 102, 103, and 104 disposed in the layout 100 of the first standard cell may be formed in a specific layer (for example, a metal layer) of the layout 100, for example.

According to an exemplary embodiment of inventive concepts, as shown in a right portion of FIG. 2, the layout 100 of the second standard cell may have a width W2 and a height H2 equal to the width W1, and height H1, respectively. That is, the layout 200 of the second standard cell may have the same size as the layout 100 of the first standard cell. Also, according to the exemplary embodiment of inventive concepts, four pins 201, 202, 203, and 204 may be placed in the layout 200 of the second standard cell, and the positions and functions of the four pins 201, 202, 203, and 204 placed in the layout 200 of the second standard cell may be the same as positions and functions of the four pins 101, 102, 103, and 104 placed in the layout 100 of the first standard cell.

According to the exemplary embodiment of inventive concepts, the layout 200 of the second standard cell may provide higher yield of the IC than the layout 100 of the first standard cell. For example, a size of the layout 200 of the second standard cell and positions of the pins placed in the layout 200 of the second standard cell may be the same as a size of the layout 100 of the first standard cell and positions of the pins placed in the layout 100 of the first standard cell respectively. However, other structures (for example, a size of an active region or a disposition of a transistor) included in the layout 200 of the second standard cell may be different from those included in the layout 100 of the first standard cell and, as a result, substitution of the second standard cell for the first standard cell may provide higher yield of the IC without incurring any penalty in the form of an additional subsequent operation.

Figure 3A:
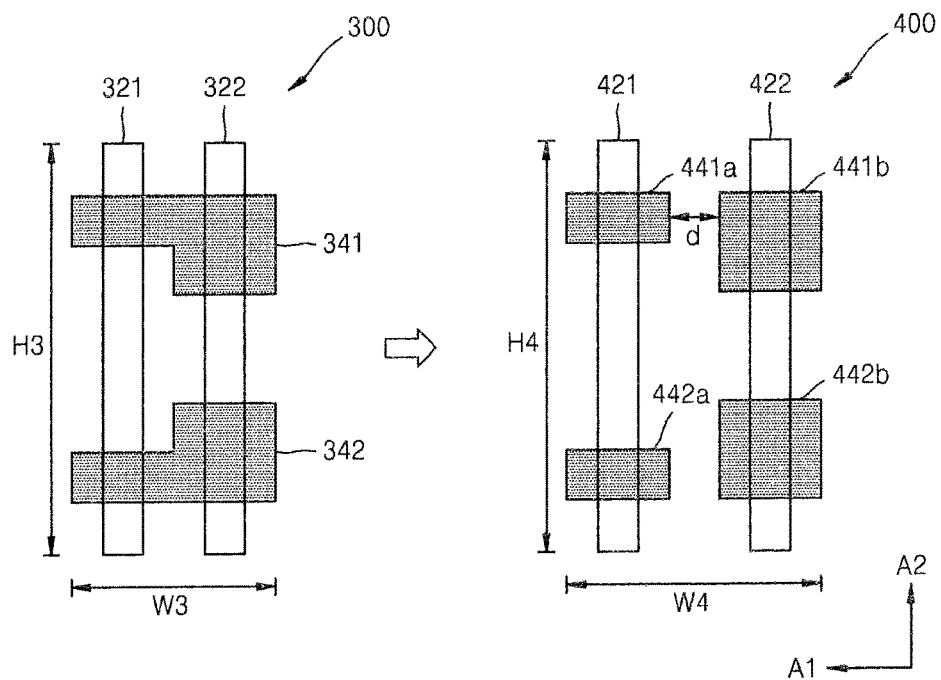
FIGS. 3A and 3B are examples of cells employing design for manufacturing (DFM)
Figure 3B:
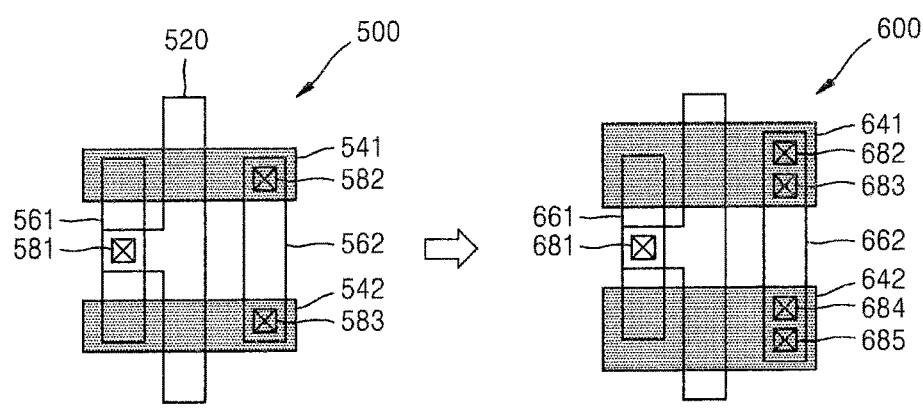

FIGS. 3A and 3B are diagrams of examples of DFM (that is, IC elements employing design for manufacture) Specifically, FIG. 3A illustrates an example of DFM for facilitating manufacture of an active region, and FIG. 3B illustrates an example of DFM for improving reliability of an IC, which may be affected by a semiconductor process. Although examples of DFM shown in FIGS. 3A and 3B may contribute toward increasing yield of a semiconductor process, a high overhead (for example, iteration of a low-level step of design of an IC) may occur during the design of the IC due to additional steps required by changing a size of a standard cell or a position of a pin.

As shown in a left portion of FIG. 3A, a layout 300 of a normal standard cell may include gate lines 321 and 322 that form a gate of a transistor, and active regions 341 and 342, The active regions 341 and 342 may be disposed in a semiconductor substrate and include doped regions in which carriers are moved, and the gate lines 321 and 322 may include polysilicon (poly-Si) or a metal.

A standard cell may include a plurality of transistors that may respectively have different sizes. For example, to reduce an input capacitance of the standard cell, a transistor having a small size may be disposed close to an input pin, and a transistor having a large size may be disposed next to the transistor having the small size. In such an embodiment, to prevent delay in unnecessary signal between transistors and increase the integration density of the transistors, as shown in the left portion of FIG. 3A, the layout 300 of the normal standard cell may include the active regions 341 and 342, which may include stepwise portions, that is, portions in which heights (or length obtained in a second direction A2) of the active regions 341 and 342 are sharply (for example, discontinuously) changed.

In terms of a semiconductor process, it may be difficult to precisely embody the stepwise portions of the active regions 341 and 342 included in the layout 300 of the normal standard cell. For example, the (ideally) stepwise portion of the active region 341 may be formed by gradually changing the height of the active region 341 instead of sharply changing the height of the active region 341 as shown in FIG. 3A, depending on a semiconductor process. In such embodiments, a characteristic of the transistor included in the normal standard cell may be changed so that the normal standard cell may not provide an expected function or performance. That is, yield of an IC including the normal standard cell may be reduced.

As shown in a right portion of FIG. 3A, a layout 400 of an enhanced standard cell embodied by improving the layout 300 of the normal standard cell employing DFM may include active regions 441a and 441b that are separated from one another. That is, in the layout 400 of the enhanced standard cell, the active region 341 included in the layout 300 of the normal standard cell may be separated into active regions 441a and 441b, and the active region 342 included in the layout 300 of the normal standard cell may be separated into active regions 442a and 442b. Thus, the layout 300 of the normal standard cell may have a width W3 (or a length obtained in a first direction A1), while the layout 400 of the enhanced standard cell may have a width W4, which is greater by "d" than the width W3. That is, the layout 400 of the enhanced standard cell may have a different size (or different footprint) from the size of the layout 300 of the normal standard cell. Because the enhanced standard cell has a different footprint, it may not be employed by a system and method in accordance with principles of inventive concepts As shown in a left portion of FIG. 3B, a layout 500 of a normal standard cell may include active regions 541 and 542, a gate line 520, metal lines 561 and 562, and contacts 581, 582, and 583. The contacts 581, 582, and 583 may provide a path through which carriers are moved, between portions disposed at different layers, for example. The contacts 581, 582, and 583 may be filled with a material in which carriers may be moved. In a semiconductor process, the contacts 581, 582, and 583 may not be filled with the material sufficiently, in which case the contacts 581, 582, and 583 may not completely form the path through which the carriers are moved.

As shown in a right portion of FIG. 3B, a layout 600 of an enhanced standard cell embodied by improving the layout 500 of the normal standard cell in terms of DFM may include multi-contacts 682, 683, 684, and 685. That is, to improve connection reliability using contacts, portions of different layers may be connected by using at least two contacts. For example, as shown in FIG. 3B, the contact 582 included in the layout 500 of the normal standard cell may be replaced by the two contacts 682 and 683 included in the layout 600 of the enhanced standard cell. As a result, the layout 600 of the enhanced standard cell may have a greater size than the layout 500 of the normal standard cell. Alternatively, the placing of a metal line 662 may be changed due to the contacts 682, 683, 684, and 685, and positions of pins of the enhanced standard cell may be different from those of pins of the normal standard cell 500. That is, the normal standard cell may have a different footprint from a footprint of the enhanced standard cell.

Because the enhanced standard cell has a different footprint, it may not be employed by a system and method in accordance with principles of inventive concepts.

Figure 4:
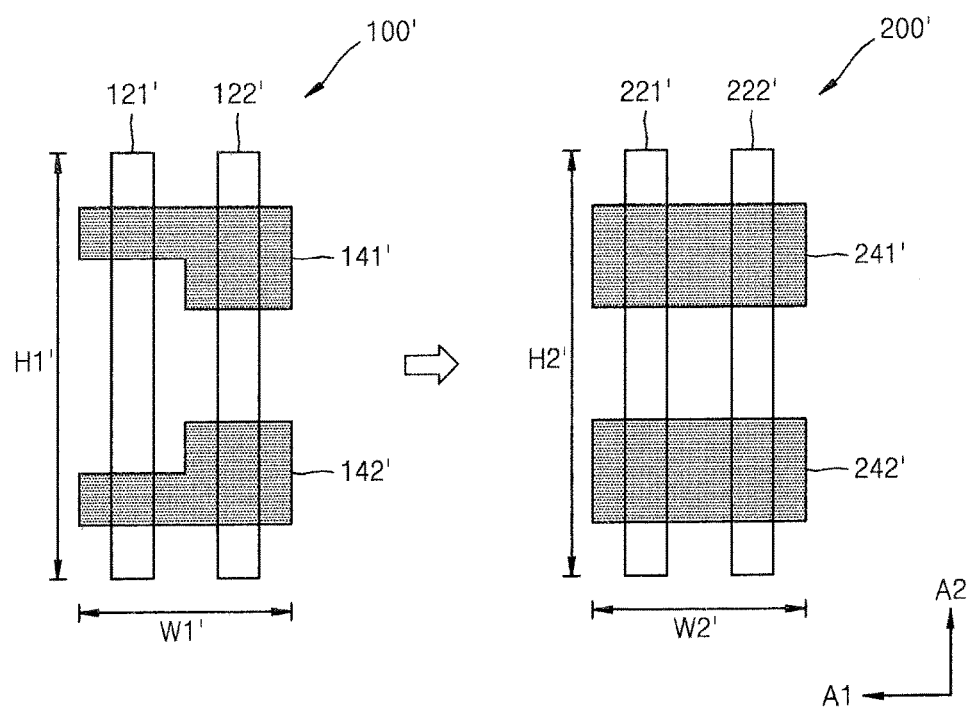
FIG. 4 illustrates layouts of first and second standard cells according to an exemplary embodiment of inventive concepts.

FIG. 4 illustrates layouts 100' and 200' of first and second standard cells according to an exemplary embodiment of inventive concepts. A footprint of the second standard cell according to the exemplary embodiment of inventive concepts may have the same footprint as a layout of the first standard cell. Thus, as described above, an operation of swapping the first standard cell included in an IC for the second standard cell may be easily performed, in that, for example, no additional subsequent steps may be required. Because the enhanced, second, standard cell has the same footprint as the first standard cell, unlike the enhanced cells of FIGS. 3A and 3B, it may be employed by a system and method in accordance with principles of inventive concepts.

As shown in a left portion of FIG. 4, a layout 100' of the first standard cell may include active regions 141' and 142' and gate lines 121' and 122'. Similar to the layout 400 of the normal standard cell shown in the left portion of FIG. 3A, the active regions 141' and 142' may include stepwise portions formed of sharply changing heights (or lengths obtained in a first direction) of the active regions 141' and 142'. As described above, it may be relatively difficult to precisely embody, or implement, the stepwise portions included in the active regions 141' and 142' in terms of a semiconductor process.

According to an exemplary embodiment of inventive concepts, as shown in a right portion of FIG. 4, the layout 200' of the second standard cell may include active regions 241' and 242', which may be formed by removing the stepwise portions from the active regions 141' and 142' of the layout 100' of the first standard cell by expanding or reducing the active regions 141' and 142' of the layout 100' of the first standard cell, for example. In this manner, in accordance with principles of inventive concepts, the layout 200' of the second standard cell may provide higher yield of the IC than the layout 100' of the first standard cell.

According to an exemplary embodiment of inventive concepts, the layout 200' of the second standard cell may be obtained by expanding or reducing the active regions 141' and 142' included in the layout 100' of the first standard cell. In accordance with principles of inventive concepts, the layout 200' of the second standard cell may have the same size as the layout 100' of the first standard cell (i.e., H1'=H2' and W1'=W2'), and pins may be disposed in the layout 200' of the second standard cell in the same manner as pins disposed in the layout 100' of the first standard cell.

Because the active regions 241' and 242' included in the layout 200' of the second standard cell have different shapes from the active regions 141' and 142' included in the layout 100' of the first standard cell, the second standard cell may exhibit different properties from those of the first standard cell. For example, a delay time of a signal transmitted through transistors connected to the active regions 241' and 242' in the second standard cell may be longer than a delay time of a signal transmitted through transistors connected to the active regions 141' and 142' in the first standard cell. Additionally, because the second standard cell has active regions 241' and 242' that are wider than active regions 141' and 142' of the first standard cell, the second standard cell may cause higher power consumption than the first standard cell. In accordance with principles of inventive concepts, a second library may include characteristics (for example, timing information and power consumption) of the second standard cell. When the first standard cell is swapped for the second standard cell, a property of the second standard cell may be considered using the information included in the second library. A method of designing an IC in consideration of the characteristics of the second standard cell will be described in greater detail in the discussion related to FIGS. 8 to 10.

Figure 5A:
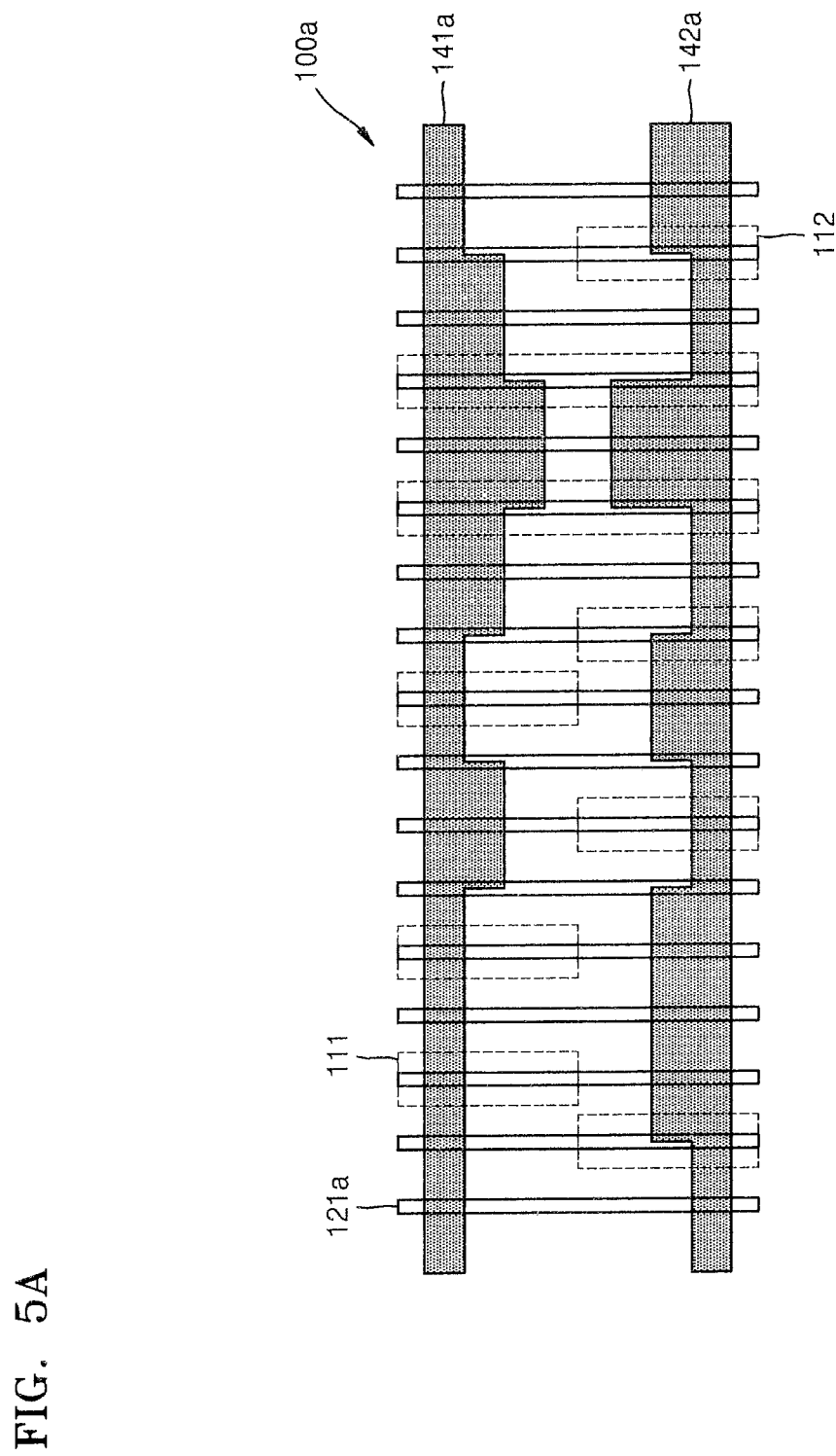
FIGS. 5A and 5B are diagrams of layout data and layouts of a first standard cell according to an exemplary embodiment of inventive concepts.
Figure 5B:
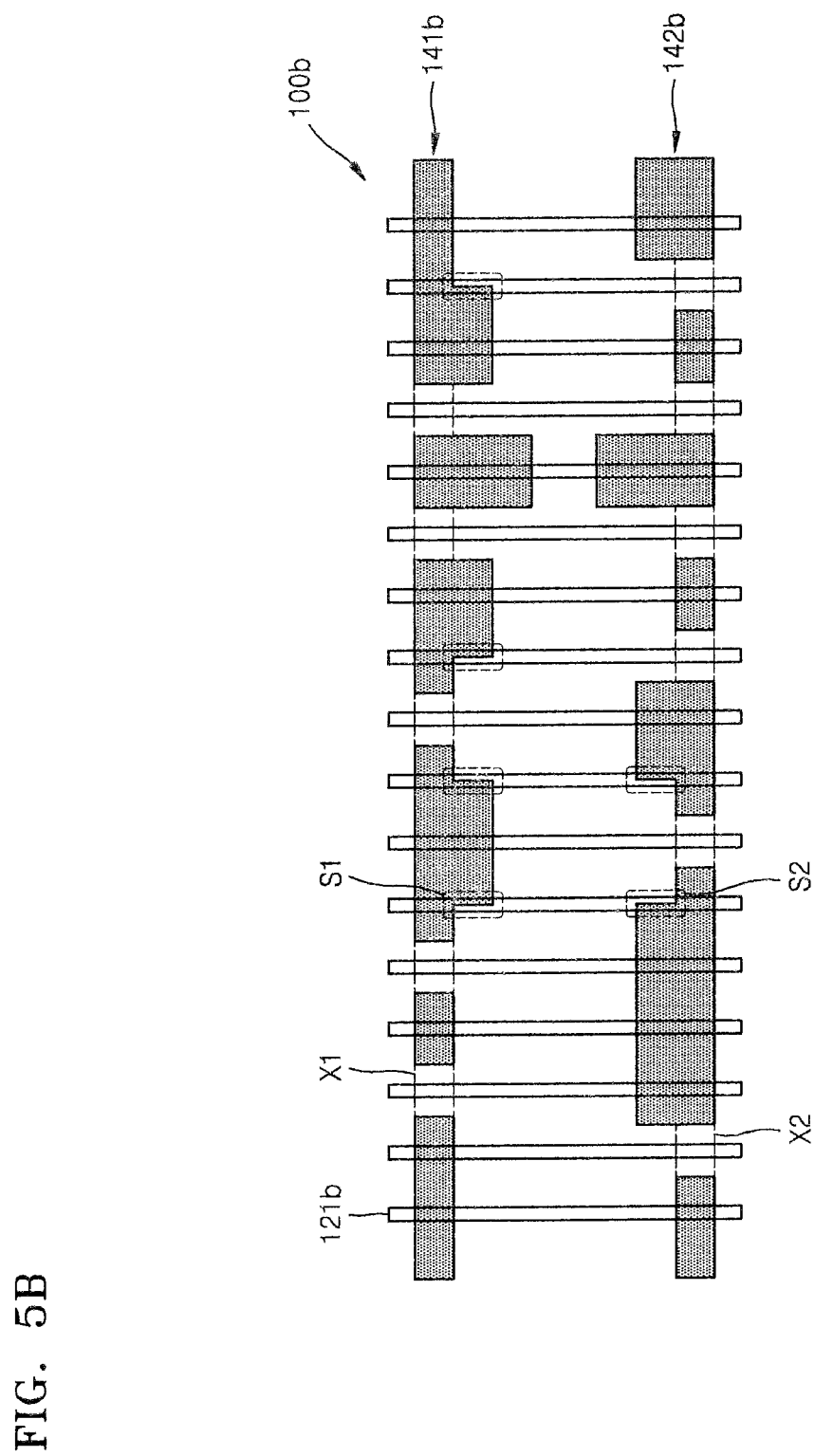
Figure 6A:
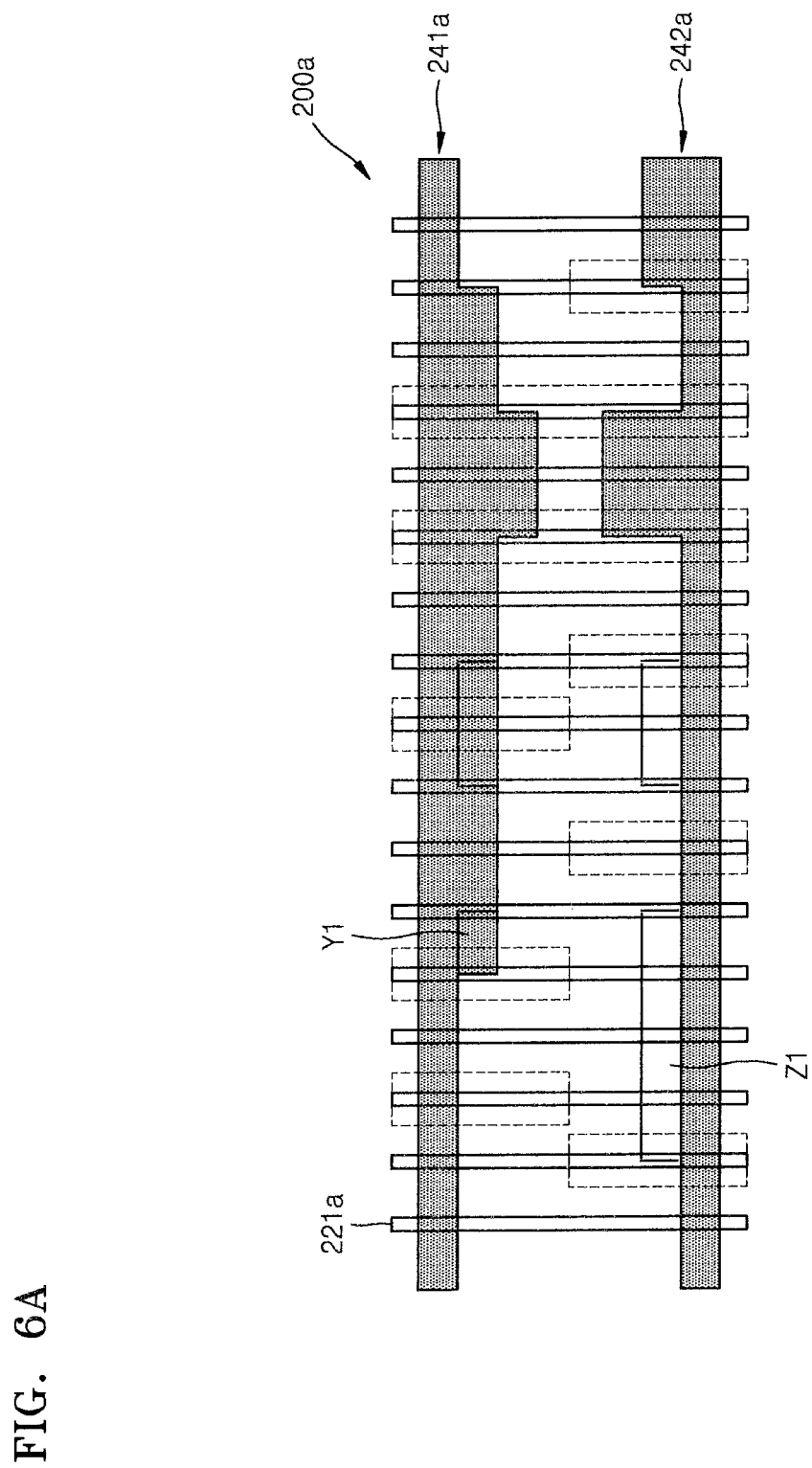
FIGS. 6A and 6B are diagrams of layout data and a layout of a second standard cell, which provides higher yield of an IC more than the layout of the first standard cell shown in FIG. 5B, according to an exemplary embodiment of inventive concepts.
Figure 6B:
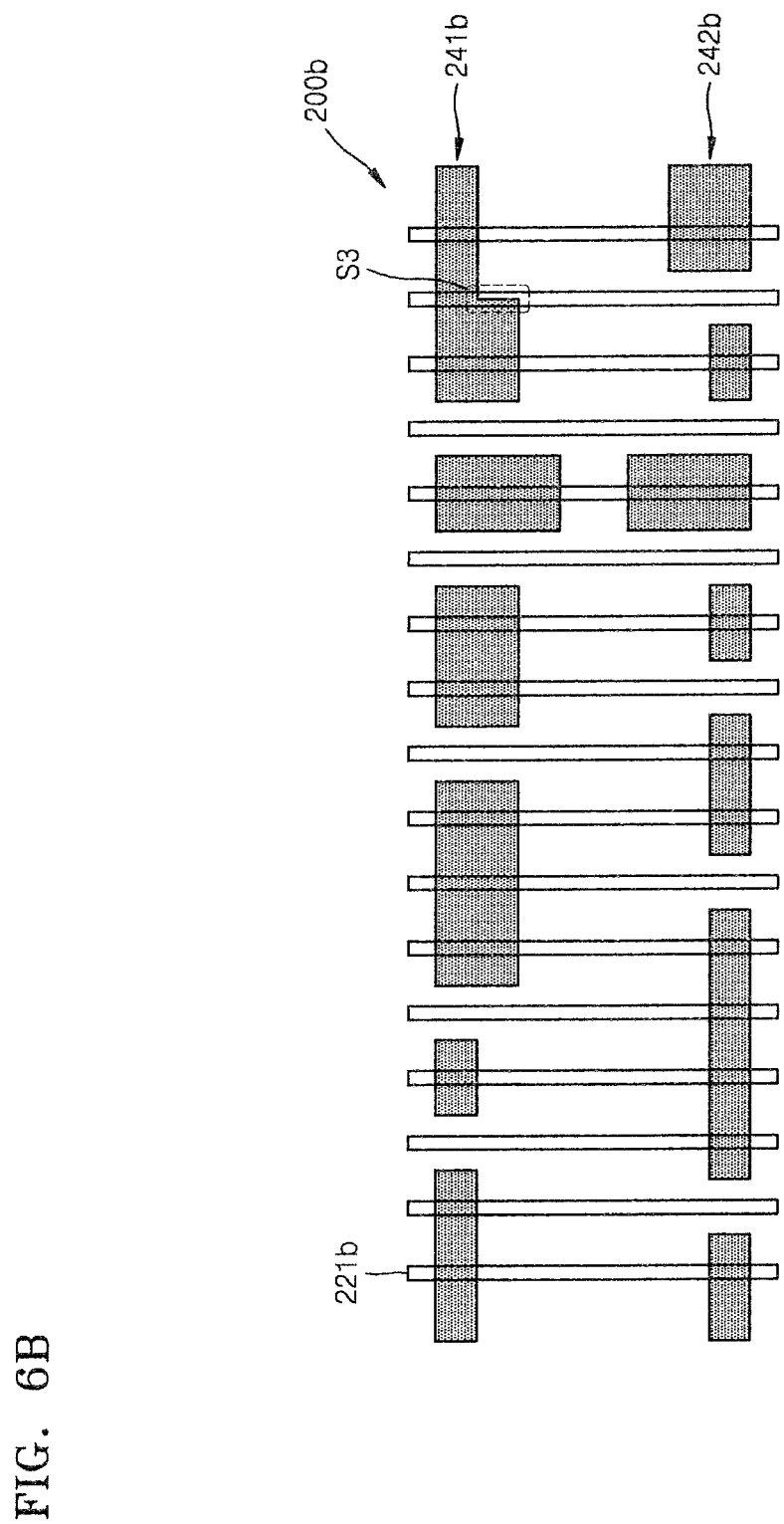

FIGS. 5A and 5B are diagrams of layout data and a layout of a first standard cell according to an exemplary embodiment of inventive concepts. FIGS. 6A and 6B are diagrams of layout data and a layout of a second standard cell, which provides a higher yield of an IC than the layout of the first standard cell shown in FIG. 5B, according to an exemplary embodiment of inventive concepts. As described above, a layout 200b of a second standard cell may have the same size as a layout 100b of a first standard cell, and pins may be disposed in the layout 200b of the second standard cell in the same manner as pins disposed in the layout 100b of the first standard cell.

As described above, because the first standard cell (that is, a standard cell corresponding to information included in a first library) is designed to have high efficiency and/or performance, as shown in FIG. 5A, layout data 100a of the first standard cell may include active regions 141a and 142a including a plurality of stepwise portions and a plurality of gate lines including a gate line 121a.

According to an exemplary embodiment of inventive concepts, the first standard cell may be etched in portions of the active regions 141a and 142a in a semiconductor process. As a result, the layout data 100a of the first standard cell may include a virtual layer indicating portions of the active regions 141a and 142a that are to be etched. For example, as illustrated with dashed lines in FIG. 5A, the layout data 100a of the first standard cell may include virtual layer indicating regions 111 and 112 that correspond to the portions of the active regions 141a and 142a that are to be etched.

As can be seen from the virtual layer shown in FIG. 5A, some of the stepwise portions included in the active regions 141a and 142a may be etched and removed. For example, one stepwise portion included in the active region 142a may be etched and removed as represented by the region 112 indicated by the virtual layer. That is, the stepwise portions of the active regions 141a and 142a, which are included in the portions to be etched, as indicated by the virtual layer in the layout data 100a of the first standard cell, may not reduce the yield of an actual semiconductor process of manufacturing the first standard cell.

FIG. 5B is a schematic diagram of the layout 100b of the first standard cell, which is obtained by removing the portions to be etched, from the active regions 141a and 142a included in the layout data 100a of the first standard cell shown in FIG. 5A. As shown in FIG. 5B, the layout 100b of the first standard cell may include active regions 141b and 142b and a plurality of gate lines including a gate line 121b. When the first standard cell is embodied using a semiconductor process including an etching of the active regions 141b and 142b, the active regions 141b and 142b may include a plurality of discontinuous portions including discontinuous portions X1 and X2 as shown in FIG. 5B.

As a result, the active regions 141b and 142b of the layout 100b of the first standard cell may include a plurality of stepwise portions, which may include stepwise portions S1 and S2, which are related with yield. As described above, although the stepwise portions included in the active regions 141b and 142b are used to increase efficiency, or performance, of the first standard cell, it may be difficult to implement the cells and, in particular, the stepwise portions in a semiconductor process.

FIG. 6A is a diagram of layout data 200a of a second standard cell according to an exemplary embodiment of inventive concepts. As shown in FIG. 6A, the layout data 200a of the second standard cell may include active regions 241a and 242a and a plurality of gate lines including a gate line 221a. Referring to FIGS. 5B and 6A, as described with reference to FIG. 4, the layout data 200a of the second standard cell according to the exemplary embodiment of inventive concepts may include active regions 241a and 242a, which may be formed by removing at least one stepwise portion included in the active regions 141a and 142a by expanding or reducing the active regions 141a and 142a of the layout data 100a of the first standard cell corresponding to produce the layout data 200a of the second standard cell. For example, the layout data 200a of the second standard cell may include the active regions 241a and 242a may include the active regions 241a and 242a, from which the at least one stepwise portion is removed by expanding or reducing, for example, the imaginary layer included in the active regions 141b and 142b of the first standard cell.

Referring to FIG. 5B, a stepwise portion S1 of the active region 141b may be removed due to a portion Y1 added in the active region 241a of FIG. 6, which corresponds to the active region 141b. Additionally, a stepwise portion S2 of the active region 142b may be removed due to a portion Z1 removed from the active region 242a of FIG. 6, which corresponds to the active region 142b. In exemplary embodiments in accordance with principles of inventive concepts, at least one of the stepwise portions included in the active regions 141b and 142b of the first standard cell may be removed by expanding (refer to the portion Y1 of FIG. 6) or reducing (refer to the portion Z1 of FIG. 6) active regions 141b and/or 142b.

FIG. 6B is a schematic diagram of the layout 200b of the second standard cell, which is formed by removing the portions to be etched from the active regions 241a and 242a included in the layout data 200a of the second standard cell shown in FIG. 6A. As shown in FIG. 6B, the layout 200b of the second standard cell may include active regions 241b and 242b and a plurality of gate lines including a gate line 121b. When the second standard cell is embodied by a semiconductor process including etching the active regions 241b and 242b, the active regions 241b and 242b may be embodied as shown in FIG. 6B.

According to an exemplary embodiment of inventive concepts, stepwise portions included in the active regions 141b and 142b of the layout 100b of the first standard cell in FIG. 5B may be selectively removed. In exemplary embodiments in accordance with principles of inventive concepts, some of a plurality of transistors included in the first standard cell may form a critical path and stepwise portions related to the transistors connected to the critical path may be left intact in the layout 200a of the second standard cell in order to maintain performance, particularly, through the critical path. For example, as shown in FIG. 6B, a stepwise portion S3 of the active region 241b may be related to a clock driver configured to process a clock signal. In exemplary embodiments in accordance with principles of inventive concepts a portion corresponding to the clock driver in the layout 200a of the second standard cell may be the same as a portion corresponding to the layout 100b of the first standard cell. In this manner, in accordance with principles of inventive concepts, the second standard cell may maintain a characteristic, for example, a period, of the clock signal, thereby maintaining performance through a critical path.

Figure 7:
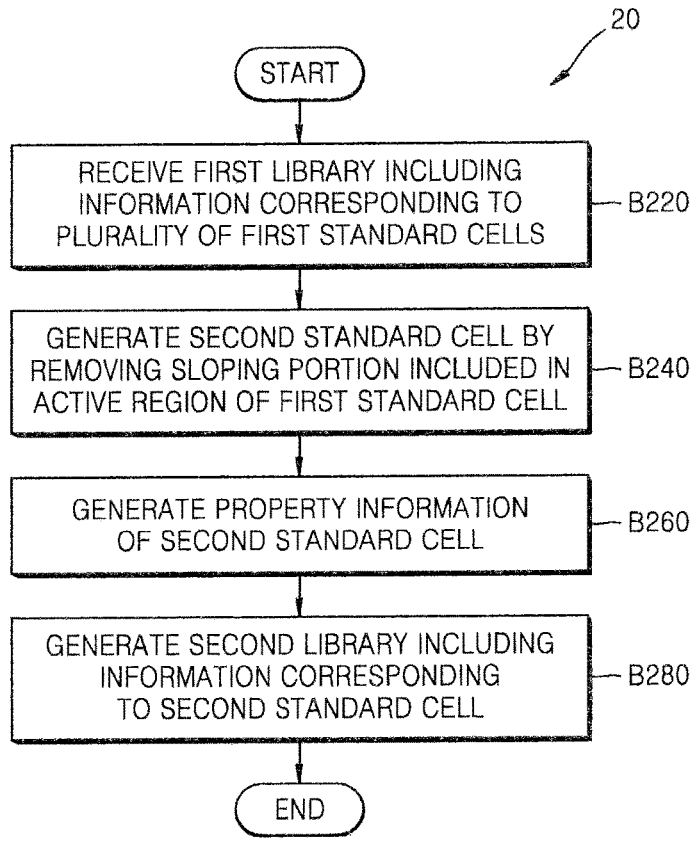
FIG. 7 is a flowchart of a method of designing an IC according to an exemplary embodiment of inventive concepts.

FIG. 7 is a flowchart illustrating a method 20 of designing an IC according to an exemplary embodiment in accordance with principles of inventive concepts. The method 20 of designing the IC according to the exemplary embodiment of inventive concepts may include generating a second library including information corresponding to a second standard cell based on a first library including a first standard cell. As shown in FIG. 1, the generated second library may be used to design a layout that may increase the yield of an IC defined using the first library.

As shown in FIG. 7, the method 20 of designing the IC may include receiving the first library including a plurality of first standard cells (B220). As described above, the first standard cells may be designed to have high efficiency, or performance, and the first library may include information regarding functions, timing information, power information, and layout information related to the plurality of first standard cells.

As shown in FIG. 7, the method 20 of designing the IC may include generating a second standard cell by removing at least one of stepwise portions included in active regions of the first standard cell (B240). Referring to FIGS. 5B and 6B, a layout 200b of the second standard cell may be generated by expanding or reducing active regions 141b and 142b in a layout 100b of the first standard cell, for example. By removing at least one of the stepwise portions included in the active regions 141b and 142b of the first standard cell, the layout 200b of the second standard cell may provide higher yield of the IC than the layout 100b of the first standard cell.

The method 20 of designing the IC may include generating property information regarding the second standard cell (B260). Since the generated second standard cell has a different layout 200b from the layout 100b of the first standard cell, properties (for example, a signal delay time and power consumption) of the second standard cell may be different from those of the first standard cell. In accordance with principles of inventive concepts, property information regarding the second standard cell may be generated, and the property information regarding the second standard cell may be used to design the IC using the second standard cell. In accordance with principles of inventive concepts, the method 20 of designing the IC may include generating the second library including the second standard cell (B280). The generated second library may include layout information regarding the second standard cell and property information regarding the second standard cell.

Figure 8:
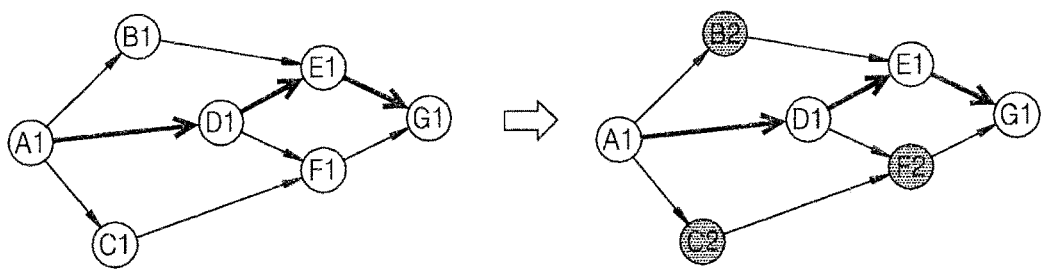
FIG. 8 is a diagram for explaining a method of swapping a first standard cell for a second standard cell according to an exemplary embodiment of inventive concepts.

FIG. 8 is a diagram for explaining a method of swapping a first standard cell for a second standard cell according to an exemplary embodiment of inventive concepts. In FIG. 8, a node denotes a standard cell, and an edge denotes the flow of a signal. As shown in a left portion of FIG. 8, an IC may be defined by first standard cells A1, B1, C1, D1, E1, F1, and G1 included in a first library. Based on timing information of a standard cell, the IC may have a critical path connected to the first standard cells A1, D1, E1, and G1, as indicated by a solid edge of FIG. 8. That is, the first standard cells A1, D1, E1, and G1 connected to the critical path may affect timing performance of the IC.

According to an exemplary embodiment of inventive concepts, at least one first standard cell that is not connected to the critical path, from among the first standard cells included in the IC, may be swapped for the corresponding second standard cell. For example, first standard cells B1, C1, and F1, which are not connected to the critical path, in the IC shown in the left portion of FIG. 8, may be respectively swapped for second standard cells B2, C2, and F2 as shown in a right portion of FIG. 8. FIG. 8 illustrates an example in which all the first standard cells B1, C1, and F1, which are not connected to the critical path, are respectively swapped for the second standard cells B2, C2, and F2, but inventive concepts are not limited thereto.

Figure 9:
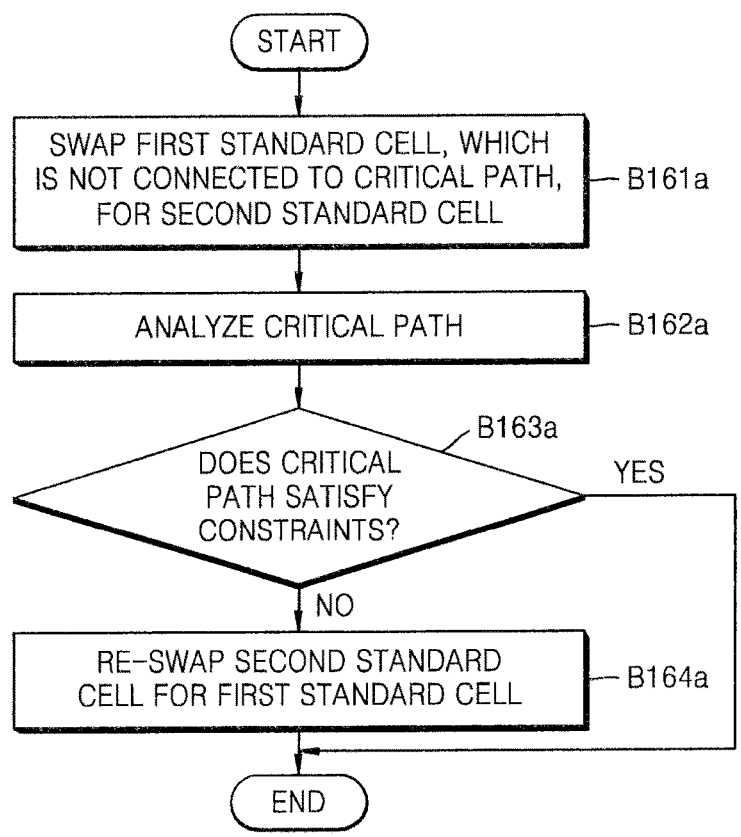
FIGS. 9 and 10 are flowcharts illustrating an operation of swapping a first standard cell included in the IC shown in FIG. 1, for a second standard cell, according to exemplary embodiments of inventive concepts.
Figure 10:
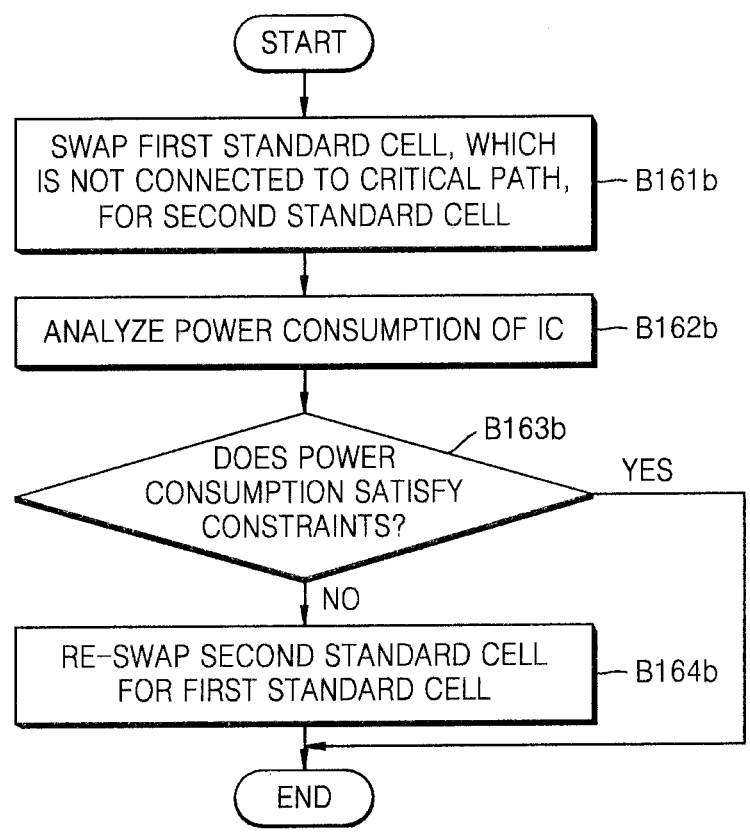

FIGS. 9 and 10 are flowcharts illustrating the operation B160 of swapping a first standard cell included in the IC shown in FIG. 1 for a second standard cell, according to exemplary embodiments of inventive concepts. In particular, FIG. 9 is a flowchart illustrating swapping a first standard cell for a second standard cell based on a processing speed of the IC according to an exemplary embodiment of inventive concepts, and FIG. 10 is a flowchart illustrating swapping a first standard cell for a second standard cell based on power consumption of the IC. The method shown in FIGS. 9 and 10 may be an example of a method of swapping one of first standard cells included in the IC, for a second standard cell. The method shown in FIGS. 9 and 10 according to the exemplary embodiment of inventive concepts may be repetitively performed on each of the first standard cells included in an IC. Although FIGS. 9 and 10 illustrate separate operations, swapping a first standard cell for a second standard cell according to an exemplary embodiment of inventive concepts may include swapping a first standard cell for a second standard cell based on both the processing speed and power consumption of the IC, or other performance characteristics, for example.

Design of an IC may be under a plurality of constraints to satisfy desired performance. For example, the IC may be under a constraint related to time taken to perform a given function and a constraint related to power consumed to perform a given function. In particular, because a semiconductor IC used for a mobile electronic device is significantly affected by performances related to data processing speed and power consumption, the semiconductor IC may be under very strict constraints related to the data processing speed and the power consumption.

As shown in FIG. 9, the method of swapping a first standard cell for a second standard cell may include swapping a first standard cell that is not connected to the critical path in the IC, as the second standard cell (B161*a*). As described with reference to FIG. 8, because the critical path may affect timing performance of the IC, a first standard cell not connected to the critical path, may be swapped for a second standard cell without degrading performance while, at the same time, improving manufacturability.

As shown in FIG. 9, a method in accordance with principles of inventive concepts of swapping a first standard cell for s second standard cell may include analyzing the critical path (B162*a*). By swapping a first standard cell for a second standard cell, the critical path of the IC may be changed. For example, an original critical path of an IC may be replaced by a new critical path that includes a second standard cell because a signal delay is increased by the second standard cell. That is, a critical path having a longer delay time than the original critical path of the IC may be formed when a second standard cell is substituted for a first standard cell.

In exemplary embodiments in accordance with principles of inventive concepts, the method of swapping a first standard cell for a second standard cell may include analyzing the critical path of the IC including the second standard cell (B162*a*), and determining whether the critical path satisfies constraints of the IC, that is, constraints related to a processing speed (B163*a*). When the critical path of the IC does not satisfy the constraints, the second standard cell may be re-swapped for the first standard cell (B164*a*). On the other hand, when the critical path of the IC including the second standard cell satisfies the constraints, the method of swapping a first standard cell for a second standard cell may be complete.

When compared with the example shown in FIG. 9, in the example shown in FIG. 10, the method of swapping a first standard cell for a second standard cell may include determining whether a first standard cell is to be swapped for a second standard cell based on power consumption of the IC. That is, as shown in FIG. 10, a method of swapping a first standard cell for a second standard cell may include analyzing power consumption of the IC with the second standard cell (B162*b*) included, and determining whether the power consumption satisfies constraints related to power consumption of the IC (B163*b*). When the power consumption of the IC does not satisfy the constraints, the second standard cell may be re-swapped for the first standard cell (B164*b*). On the other hand, when the power consumption of the IC including the second standard cell satisfies the constraints, the method of swapping the first standard cell for the second standard cell may be complete.

Figure 11:
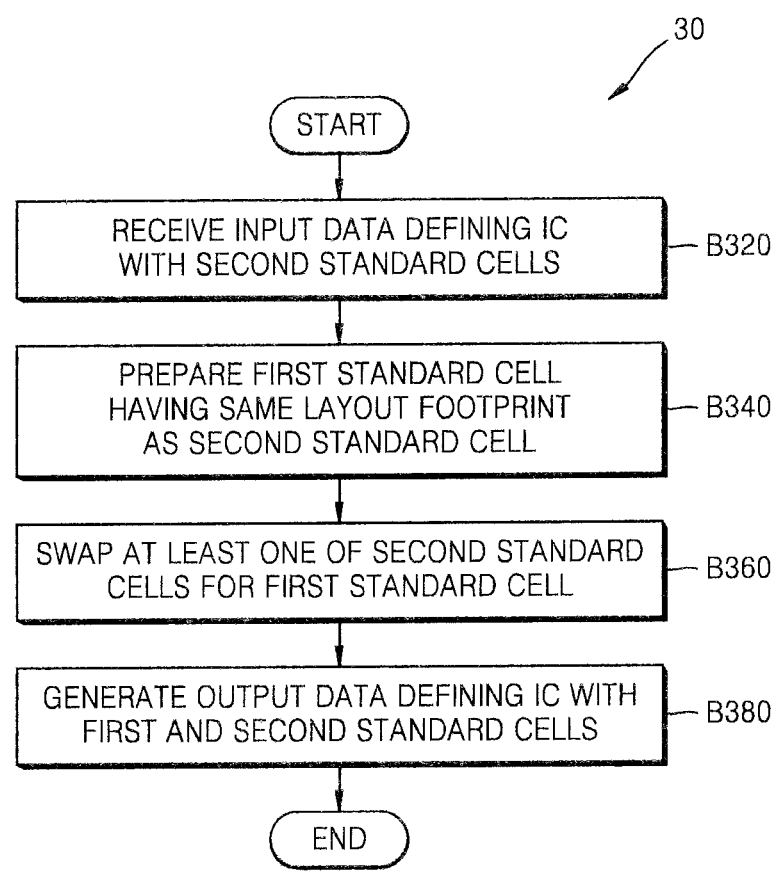
FIG. 11 is a flowchart of a method of designing an IC according to an exemplary embodiment of inventive concepts.

FIG. 11 is a flowchart of a method 30 of designing an IC according to an exemplary embodiment of inventive concepts. Specifically, FIG. 11 illustrates an exemplary embodiment in which output data defining an IC with first and second standard cells is generated by changing at least one of second standard cells included in an IC for a first standard cell, based on input data that defines the IC based on information regarding the second standard cells using a second standard cell library. For example, when an IC is under relatively loose timing constraints it may be designed using second standard cells (that is, cells developed for greater manufacturability, greater yield, with, perhaps, lower performance than first standard cells), and after the IC is defined by using the second standard cell, a second standard cell connected to a critical path may be swapped for the first standard cell. That is, the IC may be initially designed using high-yield "second" cells, then refined by substituting higher performance "first" standard cells for "second" standard cells in a critical path.

As shown in FIG. 11, the method 30 of designing the IC may include receiving input data defining the IC with second standard cells (B320). The input data may be data defined by, for example, an RTL, and define behavior of the IC as an abstract type. For example, the input data may be data that defines the IC by an HDL. The second standard cell may be a standard cell corresponding to information included in a second library. The second standard cell may correspond to each of standard cells of a first library, and have a layout that may provide higher yield than the layout of the corresponding first standard cell included in the first library.

As shown in FIG. 11, the method 30 of designing the 1C may include preparing a first standard cell having the same footprint as a layout footprint of the second standard cell (B340). When the first and second standard cells have the same footprint, the first and second standard cells may serve the same function and have the same layout size, and positions of pins of the first standard cell may be the same as positions of pins of the second standard cell.

As shown in FIG. 11, the method 30 of designing the IC may include swapping at least one of the second standard cells for the first standard cell (B360). For example, based on timing information or power consumption information regarding the IC, at least one of a plurality of second standard cells included in the IC may be swapped for the corresponding first standard cell. For example, the initial IC design may include a second standard cell, in a critical path, for example, that prevents the IC from satisfying constraints or affects performance of the IC. According to an exemplary embodiment of inventive concepts, the second standard cell may be swapped for the first standard cell (that is, a first standard cell substituted for a second) so that the IC may satisfy the constraints or have improved performance.

According to an exemplary embodiment of inventive concepts, the operation B360 of swapping the at least one of the second standard cells for the first standard cell may include swapping the at least one second standard cell for the first standard cell based on a critical path or power consumption of the IC. In exemplary embodiments, the operation B360 may include swapping a second standard cell connected to the critical path for the first standard cell, and analyzing the resultant critical path of the IC. Next, the operation B360 may include determining whether the critical path satisfies constraints. When the critical path does not satisfy the constraints, a process of swapping another second standard cell connected to the critical path for the first standard cell may be performed again. In exemplary embodiments, the operation B360 may include swapping the second standard cell connected to the critical path for the first standard cell, and analyzing the resultant power consumption of the IC. Next, the operation B360 may include determining whether the power consumption of the IC satisfies constraints. When the power consumption of the IC does not satisfy the constraints, a process of swapping another second standard cell connected to the critical path for the first standard cell may be performed again. The examples of the operation B360 may respectively correspond to the examples of the operation B160 of FIG. 1, which are shown in FIGS. 9 and 10.

As shown in FIG. 11, the method 30 of designing the IC may include generating output data defining the IC with the first and second standard cells (B380). For example, when the received input data is data (for example, a bitstream or a netlist) generated by synthesizing the IC, the output data may be a bitstream or a netlist. When the received input data is of a GDSII data type to define the layout of the IC, the output data may also be data defining the layout of the IC.

Figure 12:
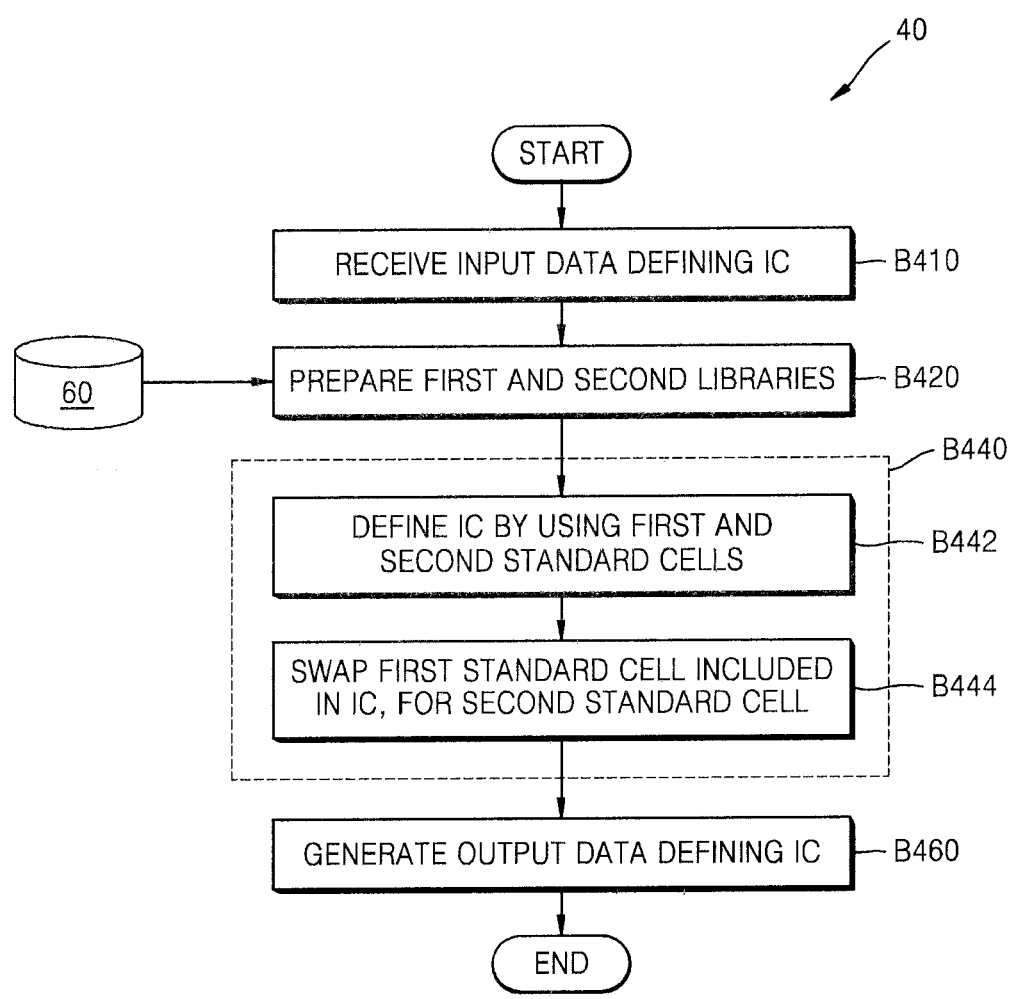
FIG. 12 is a flowchart of a method of designing an IC according to an exemplary embodiment of inventive concepts.

FIG. 12 is a flowchart of a method 40 of designing an IC according to an exemplary embodiment of inventive concepts. Specifically, FIG. 12 illustrates an example in which the IC is defined based on information regarding first and second standard cells by using first and second libraries, and at least one of first standard cells included in the IC is swapped for a second standard cell. As shown in FIG. 12, the method 40 of designing the IC may include receiving input data defining the IC (B410). The input data may be data defined by, for example, an RTL, and may define behavior of the IC as an abstract type. For example, the input data may be data that defines the IC by an HDL.

As shown in FIG. 12, the method 40 of designing the IC may include preparing the first and second libraries (B420). Each of the first and second libraries may include information corresponding to a plurality of standard cells. Standard cells corresponding to the information included in the first library may be designed to have high efficiency and standard cells corresponding to the information included in the second library may respectively correspond to the standard cells included in the first library and may have a layout that provides higher yield of the IC than a layout of the corresponding standard cell included in the first library. The first and second libraries may be stored in storage 60, and the method 40 of designing the IC may include preparing the first and second libraries (B420) by accessing the storage 60.

As shown in FIG. 12, the method 40 of designing the IC may include defining the IC using the first and second libraries (B440). In exemplary embodiments, in the operation B440, an operation B442 of defining the IC by using first standard cells corresponding to the information included in the first library and second standard cells corresponding to the information included in the second library and an operation B444 of swapping a first standard cell included in the defined IC for a second standard cell may be sequentially performed. The operation B442 of defining the IC by using the first and second standard cells may include synthesizing the IC with a plurality of first standard cells corresponding to the information included in the first library and a plurality of second standard cells corresponding to information included in the second library, and generating a netlist and a bitstream. For example, the operation B442 of defining the IC using the first and second standard cells may include defining a portion of the IC that has a relatively high timing margin using a second standard cell and defining a portion of the IC that has a relatively low timing margin using a first standard cell.

In addition, the operation B444 of swapping the first standard cell for the second standard cell may include swapping the first standard cell included in the IC for the second standard cell as in the examples shown in FIG. 9 or 10. For example, the operation B444 may include swapping the first standard cell included in the IC for the corresponding second standard cell to apply detailed (or changed) specifications of the IC and additional DFM to the IC that is defined in operation B442 to include the first and second standard cells. Next, output data defining the IC including the first and second standard cells may be generated.

Figure 13:
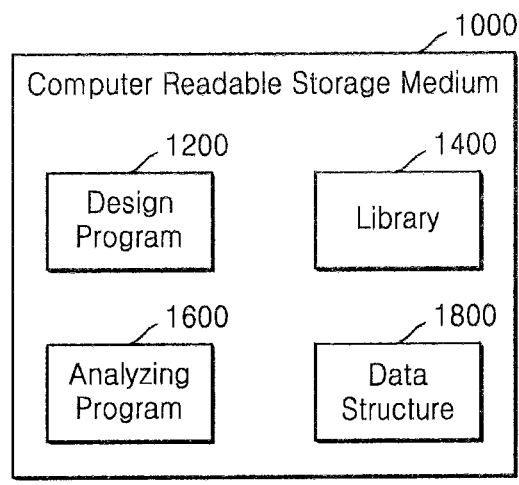
FIG. 13 is a block diagram of a computer-readable storage medium according to an exemplary embodiment of inventive concepts.

FIG. 13 is a block diagram of a computer-readable storage medium 1000 according to an exemplary embodiment of inventive concepts. The computer-readable storage medium 1000 may include computer-readable storage medium while being used to provide instructions and/or data to a computer. For example, the computer-readable storage medium 1000 may include a magnetic or optical medium (for example, a disc, a tape, a CD-ROM, a DVD-ROM, a CD-R, a CD-RW, a DVD-R, and a DVD-RW), a volatile or non-volatile memory (for example, a random access memory (RAM), a read-only memory (ROM), or a flash memory), a non-volatile memory that is accessible via a universal serial bus (USB) interface, or a microelectromechanical systems (MEMS). The computer-readable storage medium 1000 may be inserted into a computer, integrated in a computer, or combined with a computer via a network and/or a communication medium, such as a wireless link.

As shown in FIG. 13, the computer-readable storage medium 1000 may include an IC design program 1200, a library 1400, an IC analyzing program 1600, and a data structure 1800. The IC design program 1200 may include a plurality of instructions to perform a method of designing an IC according to an exemplary embodiment of inventive concepts. For example, the computer-readable storage medium 1000 may store the IC design program 1200, which may include arbitrary instructions to embody some or all of the flowcharts shown in at least one of the preceding drawings of inventive concepts.

The library 1400 may include information regarding a standard cell, which is the unit of the IC. For example, the library 1400 may include a first library including information corresponding to first standard cells having high efficiency, and a second library including information corresponding to second standard cells having layouts that provides higher yield of the IC than layouts of the first standard cells. The IC analyzing program 1600 may include a plurality of instructions to perform a method of analyzing an IC based on data that defines the IC. For example, the computer-readable storage medium 1000 may store the IC analyzing program 1600 including instructions to perform a method of analyzing a critical path of the IC or power consumption of the IC as shown in FIG. 9 or 10. The data structure 1800 may include a storage space for managing data generated during a process of designing or analyzing the IC or a process of generating a second standard cell by using a first standard cell.

Figure 14:
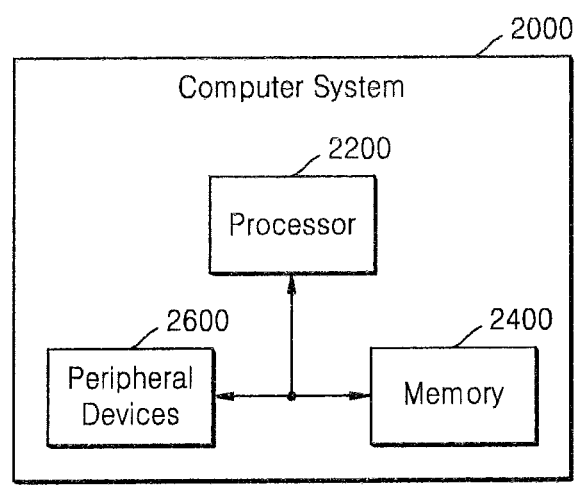
FIG. 14 is a block diagram of a computer system according to an exemplary embodiment of inventive concepts.

FIG. 14 is a block diagram of a computer system 2000 according to an exemplary embodiment of inventive concepts. Referring to FIG. 14, the computer system 2000 may include a processor 2200, a memory 2400, and various peripheral devices 2600. The processor 2200 may be connected to the memory 2400 and the peripheral devices 2600.

The processor 2200 may be configured to execute instructions to perform at least one of the methods according to the exemplary embodiments of inventive concepts. According to an exemplary embodiment of inventive concepts, the processor 2200 may execute a set of instructions (for example, Intel Architecture-32 (IA-32), 64-bit IA-32 extension, x86-64, PowerPC, Sparc, microprocessor without interlocked pipeline stages (MIPS), architecture reference manual (ARM), IA-64, etc.). Also, the computer system 2000 may include at least one processor.

The processor 2200 may be connected to the memory 2400 and the peripheral devices 2600. For example, the processor 2200 may be connected to the memory 2400 and/or the peripheral devices 2600 in various interconnection manners. In addition, at least one bridge chip may be used to form multiple connections between the processor 2200, the memory 2400, and the peripheral devices 2600 and connect the processor 2200, the memory 2400, and the peripheral devices 2600.

The memory 2400 may include, for example, a dynamic random access memory (DRAM), a double data rate synchronous DRAM (DDR SDRAM), or a Rambus DRAM (RDRAM). A memory controller may be included in the memory 2400 and interface with the memory 2400, and/or the memory controller may be included in the processor 2200. The memory 2400 may store instructions for executing the above-described method of generating a layout of an IC and data processed by the processor 2200.

The peripheral devices 2600 may include arbitrary types of hardware devices that may be included in or combined with the computer system 2000, for example, a storage device or an input/output (I/O) device (video hardware, audio hardware, user interface devices, and networking hardware).

While inventive concepts have been particularly shown and described with reference to exemplary embodiments thereof, it will be understood that various changes in form and details may be made therein without departing from the spirit and scope of inventive concepts as set forth in the following claims.

What is claimed is:

1. A method of designing an integrated circuit (IC), comprising:
   a processor receiving input data defining an IC with a plurality of first standard cells, the first standard cells having first footprints and pinouts and physical attributes that result in first yield and performance characteristics;
   the processor preparing at least one second standard cell having the same, first, footprint and pinout and as a corresponding one of the first standard cells and having a layout including physical features that provide different yield or performance characteristics of the IC than a corresponding one of the plurality of first standard cells;
   the processor swapping at least one of the first standard cells included in the IC for the corresponding second standard cell; and
   the processor generating output data defining the IC including the second standard cell,
   wherein the first and second standard cells have the same function, and
   wherein the swapping of the at least one of the first standard cells for the corresponding second standard cell comprises swapping a first standard cell that is not connected to a critical path of the IC according to the input data for the second standard cell.

2. The method of claim 1, wherein the swapping of the at least one of the first standard cells for the corresponding second standard cell further comprises re-swapping the second standard cell for the corresponding first standard cell, based on a result of analysis of the critical path of the IC including the second standard cell.

3. The method of claim 1, wherein the swapping of the at least one of the first standard cells for the corresponding second standard cell further comprises re-swapping the second standard cell for the corresponding first standard cell, based on a result of analysis of power consumption of the IC including the second standard cell.

4. The method of claim 1, wherein the input data comprises netlist data of the IC that is synthesized with the plurality of first standard cells.

5. The method of claim 1, wherein the input data comprises layout data of the IC, which is generated by placing and routing the plurality of first standard cells.

6. The method of claim 1, wherein the first standard cell comprises an active region including at least one stepwise portion, and
   the second standard cell comprises an active region from which the stepwise portion is removed.

7. The method of claim 6, wherein the active region of the first standard cell comprises at least one discontinuous portion removed by using an etching process, and
   the second standard cell comprises the active region from which the stepwise portion is removed by expanding or reducing even the at least one discontinuous portion of the active region of the first standard cell.

8. A method of designing an integrated circuit (IC), comprising:
   preparing a first library including information corresponding to a plurality of first standard cells having first footprints and pinouts and layouts having physical attributes that result in first yield and performance characteristics and a second library including information corresponding to at least one second standard cell having a layout with the same footprint and pinout as a corresponding one of the first standard cells and physical attribute that provides different yield or performance characteristics of the IC than a corresponding first standard cell;
   defining the IC based on the first and second libraries;
   a processor swapping at least one of the first standard cells included in the IC for the corresponding second standard cell; and
   the processor generating output data defining the IC including the first and second standard cells,
   wherein the swapping of the at least one of the first standard cells for the corresponding second standard cell comprises swapping a first standard cell, which is not connected to a critical path of the IC defined based on the first library, for the second standard cell.

9. The method of claim 8, wherein the swapping of the at least one of the first standard cells further comprises re-swapping the second standard cell for the corresponding first standard cell, based on a result of analysis of the critical path of the IC including the second standard cell.

10. The method of claim 8, wherein the defining of the IC based on the first and second libraries comprises generating netlist data by synthesizing the IC with the plurality of first and second standard cells.

11. The method of claim 8, wherein the defining of the IC based on the first and second libraries comprises generating layout data of the IC in which the plurality of first and second standard cells are placed and routed.

12. The method of claim 8, wherein the first standard cell comprises an active region including at least one stepwise portion, and the second standard cell comprises an active region from which the stepwise portion is removed.

13. The method of claim 12, wherein the active region of the first standard cell comprises at least one discontinuous portion that is removed by using an etching process, and the second standard cell comprises an active region, from which the stepwise portion is removed by expanding or reducing even the at least one discontinuous portion of the active region of the first standard cell.

14. A method of designing an integrated circuit, comprising:

a processor receiving input data initially-defining an integrated circuit using a plurality of first standard cells designed to include physical features that optimize a performance or yield characteristic, wherein each first standard cell has a first footprint and pinout;

the processor substituting at least one second standard cell designed to include physical features that optimize a different performance or yield characteristic from that for which the first standard cells were optimized for a corresponding one of the first standard cells, wherein each second standard cell has the same, first, footprint and pinout as a corresponding first standard cell; and the processor generating output data defining the integrated circuit including the second standard cell, wherein the first and second corresponding standard cells have the same function, wherein:

the input data comprises layout data of the integrated circuit, which is generated by placing and routing the plurality of first standard cells;

the substituting the corresponding second standard cell for at least one of the first standard cells comprises substituting for a first standard cell that is not connected to a critical path of the IC according to the input data for the second standard cell; and the first standard cell comprises an active region including at least one stepwise portion, and the second standard cell comprises an active region from which the stepwise portion is removed.

15. The method of claim 14, wherein the first standard cells are optimized for the performance characteristic of processing speed and the second standard cell is optimized for production yield.

16. The method of claim 14, wherein the first standard cells are optimized for the performance characteristic of power consumption and the second standard cells is optimized for production yield.

17. The method of claim 14, wherein the first standard cells are optimized for production yield and the second standard cells are optimized for a performance characteristic.

* * * * *